United States Patent
Lillie et al.

(10) Patent No.: US 9,176,621 B2
(45) Date of Patent: Nov. 3, 2015

(54) FLEXIBLE TIMING AND MULTIPLEXING FOR A DISPLAY DEVICE COMPRISING AN INTEGRATED CAPACITIVE SENSING DEVICE

(71) Applicant: Synaptics Incorporated, Santa Clara, CA (US)

(72) Inventors: Jeffrey S. Lillie, Mendon, NY (US); Imre Knausz, Fairport, NY (US); Murat Ozbas, Rochester, NY (US)

(73) Assignee: SYNAPTICS INCORPORATED, San Jose, CA (US)

( * ) Notice: Subject to any disclaimer, the term of this patent is extended or adjusted under 35 U.S.C. 154(b) by 238 days.

(21) Appl. No.: 13/625,031

(22) Filed: Sep. 24, 2012

(65) Prior Publication Data

US 2013/0127779 A1    May 23, 2013

Related U.S. Application Data

(60) Provisional application No. 61/561,572, filed on Nov. 18, 2011.

(51) Int. Cl.
*G06F 3/045* (2006.01)
*G06F 3/041* (2006.01)
*G06F 3/044* (2006.01)

(52) U.S. Cl.
CPC ............. *G06F 3/0416* (2013.01); *G06F 3/044* (2013.01)

(58) Field of Classification Search
CPC ....... G06F 3/0416; G06F 3/044; G06F 3/041; G06F 3/0488

USPC .................................................. 345/173–215
See application file for complete search history.

(56) References Cited

U.S. PATENT DOCUMENTS

| | | | |
|---|---|---|---|
| 5,534,892 A | 7/1996 | Tagawa | |
| 5,896,120 A | 4/1999 | Iguchi et al. | |
| 6,239,788 B1 | 5/2001 | Nohno et al. | |
| 6,670,943 B1 | 12/2003 | Ishii et al. | |
| 7,075,316 B2 | 7/2006 | Umeda et al. | |
| 7,868,874 B2 | 1/2011 | Reynolds | |
| 2002/0185981 A1 | 12/2002 | Dietz et al. | |
| 2004/0066361 A1 | 4/2004 | Ishii et al. | |
| 2004/0217945 A1 | 11/2004 | Miyamoto et al. | |
| 2006/0012575 A1 | 1/2006 | Knapp et al. | |
| 2007/0109274 A1* | 5/2007 | Reynolds ...................... 345/173 |
| 2008/0062139 A1 | 3/2008 | Hotelling et al. | |
| 2008/0062140 A1 | 3/2008 | Hotelling et al. | |
| 2008/0062147 A1 | 3/2008 | Hotelling et al. | |
| 2008/0062148 A1 | 3/2008 | Hotelling et al. | |
| 2008/0158167 A1* | 7/2008 | Hotelling et al. ............. 345/173 |
| 2008/0165112 A1 | 7/2008 | Su | |
| 2008/0263260 A1* | 10/2008 | Snyder et al. ................. 711/100 |

(Continued)

*Primary Examiner* — Aneeta Yodichkas
*Assistant Examiner* — Brent D Castiaux
(74) *Attorney, Agent, or Firm* — Patterson + Sheridan, LLP

(57) ABSTRACT

Embodiments of the invention generally provide an input device that simultaneously transmits a multiplexed signal across two or more transmitter electrodes used in touch detection. The multiplexed includes two or more component signals that are transmitted on respective electrodes (or channels). The component signals are then decoded and correlated to indicate a positional location of an input object. Various multiplexing schemas—e.g., code division multiplexing, frequency division multiplexing, orthogonal frequency division multiplexing, and the like—may be used to generate the multiplex signal and then demultiplex the received results.

18 Claims, 10 Drawing Sheets

(56) References Cited

U.S. PATENT DOCUMENTS

| | | |
|---|---|---|
| 2008/0309628 A1 | 12/2008 | Krah et al. |
| 2009/0189867 A1 | 7/2009 | Krah et al. |
| 2009/0273579 A1 | 11/2009 | Zachut et al. |
| 2010/0001973 A1 | 1/2010 | Hotelling et al. |
| 2010/0059295 A1 | 3/2010 | Hotelling et al. |
| 2010/0060591 A1 | 3/2010 | Yousefpor et al. |
| 2010/0193257 A1 | 8/2010 | Hotelling et al. |
| 2010/0194695 A1 | 8/2010 | Hotelling et al. |
| 2010/0194696 A1 | 8/2010 | Chang et al. |
| 2010/0194697 A1 | 8/2010 | Hotelling et al. |
| 2010/0194698 A1 | 8/2010 | Hotelling et al. |
| 2010/0238134 A1* | 9/2010 | Day et al. ............ 345/174 |
| 2010/0289758 A1* | 11/2010 | Matsubara ............ 345/173 |
| 2011/0042153 A1 | 2/2011 | Wu et al. |
| 2011/0050585 A1 | 3/2011 | Hotelling et al. |
| 2011/0210939 A1 | 9/2011 | Reynolds et al. |
| 2011/0210940 A1 | 9/2011 | Reynolds |
| 2011/0210941 A1* | 9/2011 | Reynolds et al. ......... 345/174 |
| 2011/0267305 A1* | 11/2011 | Shahparnia et al. ...... 345/174 |

* cited by examiner

FLEXIBLE TIMING AND MULTIPLEXING FOR A DISPLAY DEVICE COMPRISING AN INTEGRATED CAPACITIVE SENSING DEVICE

CROSS-REFERENCE TO RELATED APPLICATIONS

This application claims benefit of U.S. provisional patent application Ser. No. 61/561,572, filed Nov. 18, 2011 entitled "SYSTEM AND METHOD FOR PROVIDING FLEXIBLE TIMING AND POLARITY CONTROL FOR A DISPLAY DEVICE COMPRISING AN INTEGRATED CAPACTIVE SENSING DEVICE" by Jeffrey Lillie, Imre Knausz, and Murat Ozbas, which is herein incorporated by reference.

BACKGROUND OF THE INVENTION

1. Field of the Invention

Embodiments of the present invention generally relate to increasing the signal to noise ratio during touch detection, or more specifically, simultaneously transmitting a multiplexed signal across multiple transmitter electrodes.

2. Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY OF THE INVENTION

Embodiments of the invention generally provide a processing system coupled to transmitter electrodes and receiver electrodes. The processing system includes a driver module coupled to the transmitter electrodes, each of the transmitter electrodes including one or more common electrodes configured for display updating and touch detection. The driver module is configured to simultaneously drive a first one of the transmitter electrodes with a first signal and second one of the transmitter electrodes with a second signal where the first signal and the second signal are based on different codes of a plurality of distinct digital codes and each of the distinct digital codes is substantially mathematically independent from each other. The processing system includes a receiver module coupled to the receiver electrodes, the receiver module configured to receive, using the receiver electrodes, resulting signals based on the first and second signals. The processing system includes a determination module configured to generate demodulated output signals by demodulating the resulting signals based on the distinct digital codes and to determine positional information for an input object at least partially based on the demodulated output signals.

Embodiments of the invention generally provide a display device having an integrated capacitive sensing device. The display device includes receiver electrodes and transmitter electrodes where each of the transmitter electrodes comprising one or more common electrodes configured for display updating and touch detection. The display device includes logic circuitry disposed on a substrate comprising the transmitter electrodes and a processor coupled to the transmitter electrodes via the logic circuitry, where, during a first period, the processor is configured to transmit control signals to the logic circuitry to simultaneously drive a first one of the transmitter electrodes with a first signal and second one of the transmitter electrodes with a second signal. The first signal and the second signal are based on different codes of a plurality of distinct digital codes and each of the distinct digital codes is substantially mathematically independent from each other. The processor is coupled to the receiver electrodes and configured to receive, using the receiver electrodes, resulting signals based on the first and second signals during the first period. The processor is configured to generate demodulated output signals by demodulating the resulting signals based on the distinct digital codes and to determine positional information for an input object at least partially based on the demodulated output signals.

Embodiments of the invention may further provide a method for performing touch detection. The method includes transmitting simultaneously a first transmitter signal on a first transmitter electrode and a second transmitter signal on a second transmitter electrode, wherein each of the transmitter electrodes comprises one or more common electrodes configured for both updating displayed information in a display screen and performing touch transmitter. The first and second transmitter signals are respective channels of a multiplexed signal generated according to a multiplexing schema. The method also includes receiving a first resulting signal on a first receiver electrode based on the first transmitter signal and a second resulting signal on a second receiver electrode based on the second transmitter signal. The method includes demultiplexing the first and second resulting signals and determining positional information for an input object at least partially based on the demultiplexed signals.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
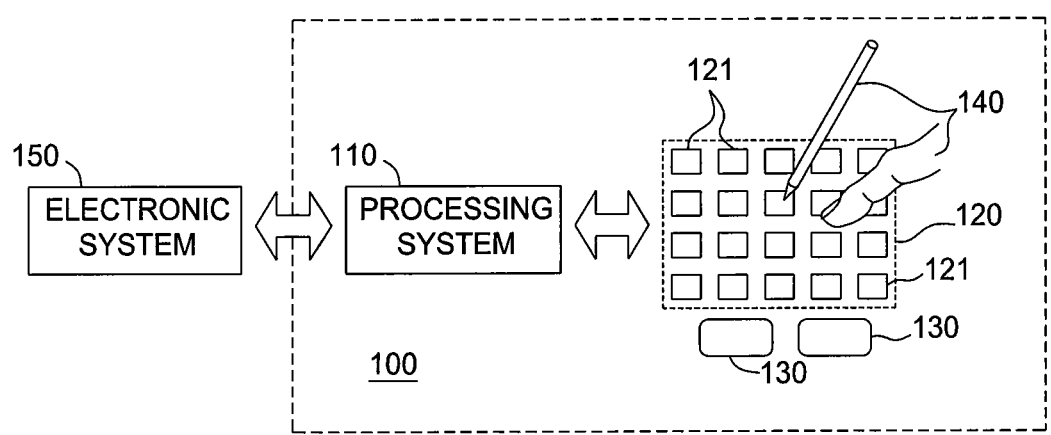
FIG. 1 is a schematic block diagram of an exemplary input device, according to an embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide input devices and methods for improving usability. Specifically, the input device simultaneously transmits a multiplexed signal across two or more transmitter electrodes used in touch detection. The multiplexed signal includes two or more component signals that are transmitted on respective electrodes (or channels). The component signals are then decoded and correlated to indicate a positional location of an input object in a touch detection area of the input device. Various multiplexing schemas—e.g., code division multiplexing, frequency division multiplexing, orthogonal frequency division multiplexing, and the like—may be used to generate the multiplex signal and demultiplex the received results. For example, the input device may use orthogonal digital codes to generate a component signal for each of the transmitter electrodes where, for a certain number of clock cycles, each one of the component signals is inverted respective to the others. The input device then decodes the component signals to determine a location of an object in the touch detection area of the input device.

FIG. 1 is a block diagram of an exemplary input device 100, in accordance with embodiments of the present technology. Although embodiments of the present disclosure may be utilized in a input device 100 including a display device integrated with a sensing device, it is contemplated that the invention may be embodied in display devices without integrated sensing devices. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements 121 for detecting user input. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 121 pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements 121 to create electric fields. In some capacitive implementations, separate sensing elements 121 may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitter electrodes or receiver electrodes, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen of the display device 101. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 101 may share physical elements. For example, some embodiments may utilize some of the same electrical components for displaying and sensing. As another example, the display device 101 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
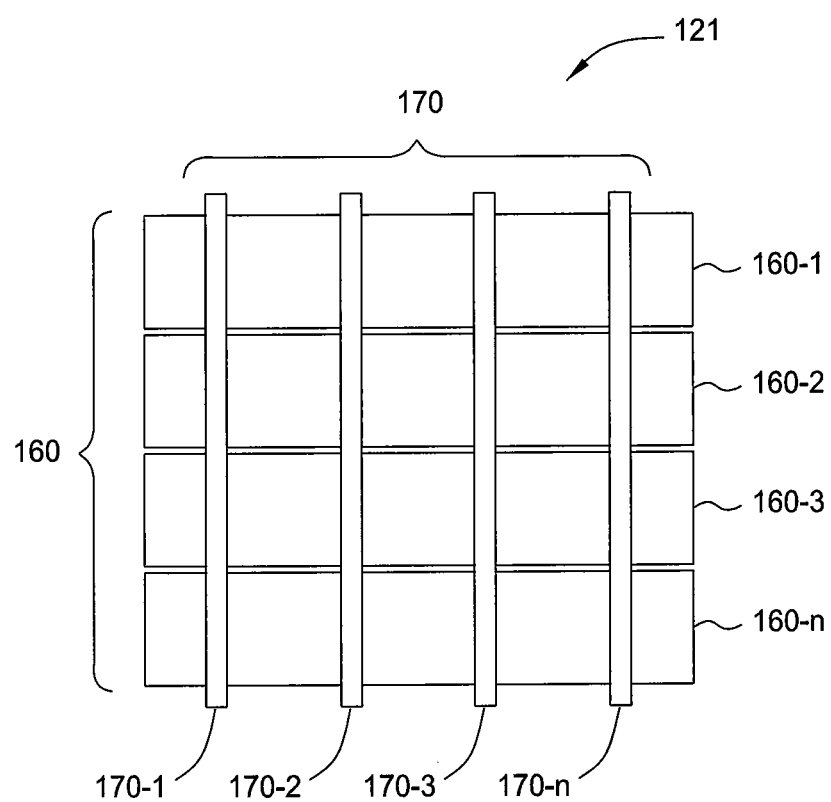
FIG. 2 illustrates a stack-up of a sensor assembly that may be used in the input device to sense the input object, according to an embodiment described herein.

FIG. 2 shows a portion of an exemplary pattern of sensing elements 121 configured to sense in a sensing region associated with the pattern, according to some embodiments. For clarity of illustration and description, FIG. 2 shows the sensing elements 121 in a pattern of simple rectangles, and does not show various components. This pattern of sensing elements 121 comprises a first plurality of sensor electrodes 160 (160-1, 160-2, 160-3, . . . 160-$n$), and a second plurality of sensor electrodes 170 (170-1, 170-2, 170-3, . . . 170-$n$) disposed over the plurality of transmitter electrodes 160. In one embodiment, this pattern of sensing elements 121 comprises a plurality of transmitter electrodes 160 (160-1, 160-2, 160-3, . . . 160-$n$), and a plurality of receiver electrodes 170 (170-1, 170-2, 170-3, . . . 170-$n$) disposed over the plurality of transmitter electrodes 160. In another embodiment, the first plurality of sensor electrodes may be configured to transmit and receive and the second plurality of sensor electrodes may also be configured to transmit and receive.

Transmitter electrodes 160 and receiver electrodes 170 are typically ohmically isolated from each other. That is, one or more insulators separate transmitter electrodes 160 and receiver electrodes 170 and prevent them from electrically shorting to each other. In some embodiments, transmitter electrodes 160 and receiver electrodes 170 are separated by insulative material disposed between them at cross-over areas; in such constructions, the transmitter electrodes 160 and/or receiver electrodes 170 may be formed with jumpers connecting different portions of the same electrode. In some embodiments, transmitter electrodes 160 and receiver electrodes 170 are separated by one or more layers of insulative material. In some other embodiments, transmitter electrodes 160 and receiver electrodes 170 are separated by one or more substrates; for example, they may be disposed on opposite sides of the same substrate, or on different substrates that are laminated together.

The areas of localized capacitive coupling between transmitter electrodes 160 and receiver electrodes 170 may be termed "capacitive pixels." The capacitive coupling between the transmitter electrodes 160 and receiver electrodes 170 change with the proximity and motion of input objects in the sensing region associated with the transmitter electrodes 160 and receiver electrodes 170.

In some embodiments, the sensor pattern is "scanned" to determine these capacitive couplings. That is, the transmitter electrodes 160 are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 170 to be independently determined.

The receiver sensor electrodes 170 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of a sensor device is the capacitive image associated with no input object in the sensing region. The background capacitance changes with the environment and operating conditions, and may be estimated in various ways. For example, some embodiments take "baseline images" when no input object is determined to be in the sensing region, and use those baseline images as estimates of their background capacitances.

Capacitive images can be adjusted for the background capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, transmitter electrodes 160 comprise one or more common electrodes (e.g., "V-com electrode" or source drive electrode) used in updating the display of the display screen. These common electrodes may be disposed on an appropriate display screen substrate. For example, the common electrodes may be disposed on the TFT glass in some display screens (e.g., In Plane Switching (IPS) or Plan to Line Switching (PLS)), on the bottom of the color filter glass of some display screens (e.g., Patterned Vertical Alignment (PVA) or Multi-domain Vertical Alignment (MVA)), etc. In such embodiments, the common electrode can also be referred to as a "combination electrode", since it performs multiple functions. In various embodiments, each transmitter electrode 160 comprises one or more common electrodes. In other embodiments, at least two transmitter electrodes 160 may share at least one common electrode.

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the background capacitance image. Thus, if a first capacitive image is acquired when the display updating is at a first state, and a second capacitive image is acquired when the display updating is at a second state, the first and second capacitive images may differ due to differences in the background capacitive image associated with the display updating states, and not due to changes in the sensing region. This is more likely where the capacitive sensing and display updating electrodes are in close proximity to each other, or when they are shared (e.g. combination electrodes). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer of the display frame rate.

For convenience of explanation, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a first display updating state is considered to be of a third frame type, and so on. Where the relationship of display update state and capacitive image acquisition is periodic, capacitive images acquired cycle through the frame types and then repeats. In some embodiments, there may be "n" capacitive images for every display updating state.

Transmitting Multiplexed Signals

Figure 3A:
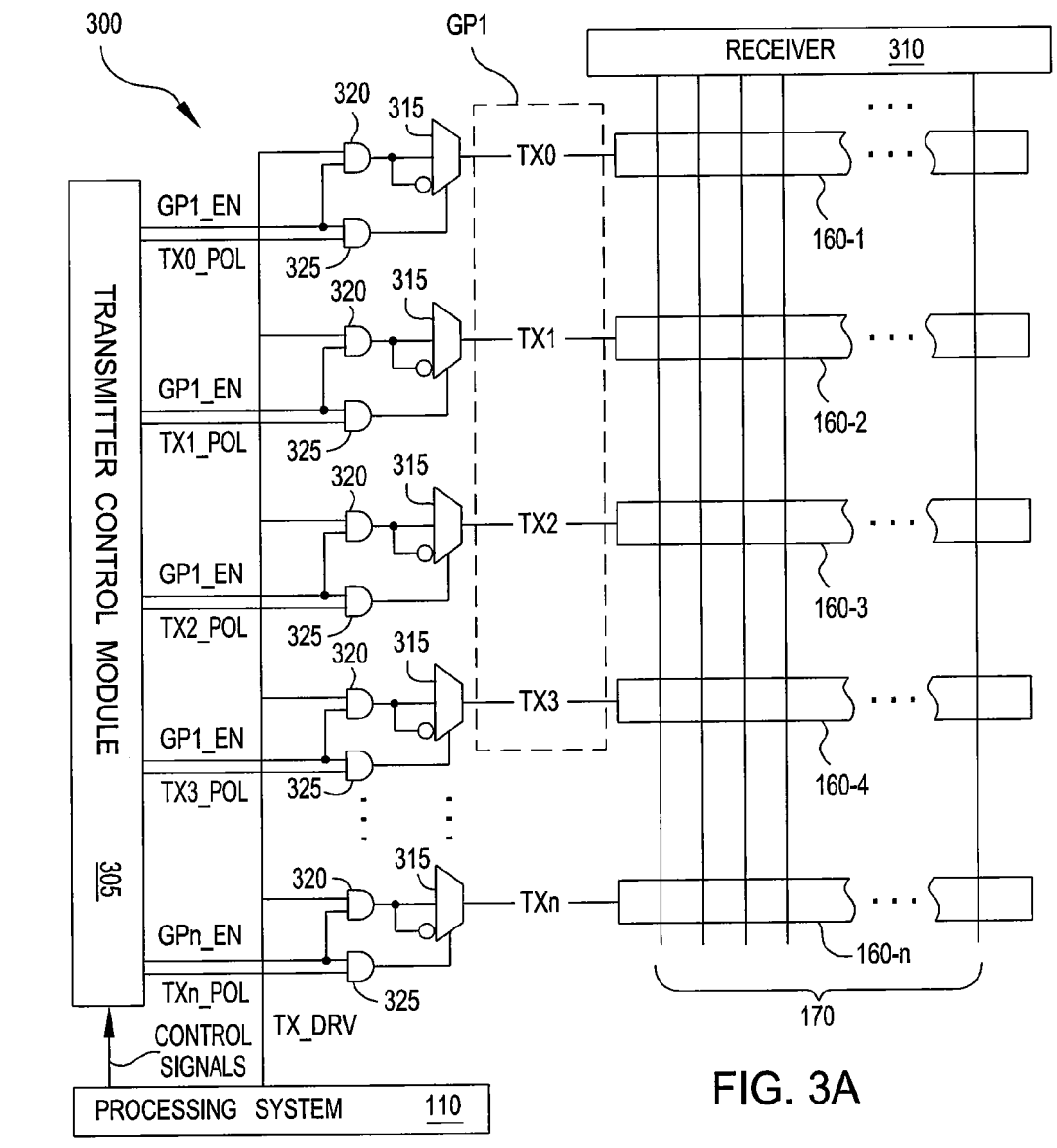
FIG. 3A is a schematic diagram of a system for transmitting a multiplexed signal suitable for use with the display device and integrated capacitive sensing device shown in FIG. 1, according to an embodiment described herein.

FIG. 3A is a schematic diagram of a system 300 for transmitting a multiplexed signal suitable for use with the display device 101 and integrated capacitive sensing device 100 shown in FIG. 1. The system 300 includes transmitter control module, 305, processing system 110, receiver 310, control logic 320, 315, 325, and the electrodes 160 and 170. The transmitter control module 305 is coupled to the transmitter electrodes 160-1-160-$n$ and to the processing system 110. The processing system 110 communicates with the transmitter control module 305 using various control signals and identifies at least two transmitter electrodes 160 to transmit a multiplexed signal. The different elements of the transmitter control module 305 may be internal to, or external of, the processing system 110. Alternatively, the elements of the module 305 may be distributed between the processing system 110 and a substrate that includes the transmitter electrodes 160. Moreover, the processing system 110 may be disposed on the same substrate that includes the electrodes 160 or be disposed on a different substrate in the display device 101. In one embodiment, the transmitter control module 305 is a driver module of processing system 110.

The system 300 divides the different transmitter electrodes 160 (which contain one or more common electrodes that form transmitter electrodes) into groups that the transmitter control module 305 can control individually. As shown here, TX0, TX1, TX2, and TX3 are all transmitter electrodes that are assigned to Group 1 (GP1). That is, to activate electrodes 160-1-160-4, the transmitter control module 305 uses the group specific signal GP1_EN which, along with the TX_DRV signal, activates the selectors 315 (e.g., multiplexers) for generating transmitter signals on the four transmitter electrodes 160-1-160-4. Specifically, so long as GP1_EN is high and the respective selector signals for the selectors 315 instruct the selectors 315 to output the non-inverted outputs of the AND gates 320, the TX_DRV signal is transmitted on the electrodes 160 of Group 1. If GP1_EN goes low—i.e., Group 1 is no longer selected—additional circuitry (not shown) may be used to output a DC reference voltage—e.g., V-com or ground. As used herein, V-com is a reference voltage used in an input device when updating a display screen as well as when performing touch detection. In one embodiment, V-com is the backplane voltage in the display screen that serves as the reference voltage for the pixels in the screen.

Although system 300 illustrates a group of four transmitter electrodes, any number of transmitter electrodes may be assigned to a group. Furthermore, an input device may contain transmitter electrode groups with different numbers of transmitter electrodes 160 in them. For example, the input device may have five groups that each contains four transmitter electrodes and one group containing only two transmitter electrodes.

In FIG. 3A, the transmitter control module 305 uses the various signals to transmit a multiplexed signal with four component signals that are each transmitted on one of the transmitter electrodes 160 in a group. That is, each transmitter electrode 160 provides a channel that is used to transmit a particular component signal (i.e., a type of transmitter signal) of the multiplexed signal. In one embodiment, the different component signals may be based on distinct digital codes defined in a code division multiplexing (CDM) schema. The distinct digital codes may be used to determine the polarity (or a phase shift) of the component signals transmitted on the electrodes 160 in a group. As used herein, "polarity" is used to describe the phase of a component signal relative to the other component signals in a multiplexed signal. More specifically, the polarity may represent a 180 degree phase shift such that one component signal is inverted relative to the other component signals.

In one embodiment, the digital codes may be represented by a matrix, where each element of the matrix represents the polarity of the transmitter signal for a particular drive period—i.e., one or more clock cycles. For the TX0-TX4, the codes may be represented by a four by four matrix such as:

$$\begin{bmatrix} 1 & 1 & 1 & -1 \\ 1 & 1 & -1 & 1 \\ 1 & -1 & 1 & 1 \\ -1 & 1 & 1 & 1 \end{bmatrix}$$

where each row corresponds to a transmitter electrode 160 in the group and each column corresponds to the polarity of the transmitter signals for a particular drive period. In addition, each row represents a digital code transmitted by the electrode 160. As can be seen from the matrix, during a first drive period, component signals having a first polarity are driven on the first, second, and third transmitter electrode while a component signal having a second polarity is simultaneously driven on a fourth transmitter electrode. Further, during a second drive period, component signals having the first polarity are driven on the first, second, and fourth transmitter electrodes while a component signal having the second polarity is driven on the third transmitter electrode, and so on. In this manner, the transmitter control module 305 transmits a multiplexed signal (a column of the matrix) during at least four drive periods. Stated differently, the matrix may represent four multiplexed signals sent at four different time periods using the transmitter electrodes. In one embodiment, the rows or digital codes are orthogonal and mathematically independent relative to each other.

Because the transmitter electrodes 160 are capacitively coupled to the receiver electrodes 170, the component signals transmitted on TX0-TXn according to matrix above may be received at four different receiver interfaces of the receiver 310 which demodulates (or demultiplexes) the received signals using the distinct digital codes to produce a plurality of output signals. Because the digital codes transmitted by the module 305 are orthogonal, any interference (or leakage) caused by simultaneously transmitting the four component signals can be filtered out. That is, the orthogonal component signals permit the receiver 310 to eliminate the contribution of the other signals when evaluating each intersection of a transmitter electrode 160 and receiver electrode 170. Although not shown specifically, in system 300 the receiver electrodes 170 and the transmitter electrodes 160 may be located on different layers of a common substrate. That is, the transmitter electrodes 160 may be located on a first layer that is separated from the receiver electrodes 170 in a second layer by a dielectric material. Moreover, in one embodiment, the receiver 310 may be part of the processing system 110. Furthermore, the receiver 310 and the processing system 110 may be located in the same integrated circuit.

In one embodiment, the output signals generated by the receiver 310 may be used to determine positional information based on the intersection of the transmitter and receiver electrodes 160, 170. In another embodiment, a capacitive image may be determined based on the output signals. Once the output signals are determined, measurements of change in the capacitive coupling between each transmitter electrode and each of the plurality of receiver electrodes may be determined based on the output signals.

In some embodiments, the component signals are substantially orthogonal in terms of time, frequency, or the like—i.e., exhibit very low cross-correlation, as is known in the art. In such embodiments, the component signals are based on substantially orthogonal codes. That is, two signals may be considered substantially orthogonal even when those signals do not exhibit strict, zero cross-correlation.

In one embodiment, for example, the transmitted signals include pseudo-random sequence codes. In other embodiments, Walsh codes, Gold codes, Hadamard codes or other appropriate quasi-orthogonal or orthogonal codes are used. Regardless of whether the codes are orthogonal or substantially orthogonal, the codes generate a multiplex signal that provides mathematically independent and results. Moreover, the orthogonal codes may generate un-correlated resulting signals. The mathematical independence of the transmitted signals permits the input device to detect the results from each of the simultaneous transmission. In the example shown in the matrix above, four simultaneous transmissions generate four results and may quadruple the throughput for a given amount of time.

Moreover, many of the embodiments discussed herein disclose transmitting orthogonal (or substantially orthogonal) signals based on codes in a CDM schema, however, the present disclosure is not limited to such. In general, any multiplexing schema that enables transmitting multiple component signals simultaneously on multiple transmitter electrodes is within the scope of this disclosure. For example, instead of using digital codes to change the polarity of the transmitted signal, the transmitter control module 305 may transmit a multiplexed signal with four component signals with orthogonal frequencies. That is, the module 305 may use an orthogonal frequency division multiplexing (OFDM) schema which uses a plurality of orthogonal sub-carrier signals as the component signals. In this embodiment, each transmitter electrode 160 in a group transmits a component signal with a different frequency where the frequencies vary during the different drive periods. In OFDM, each receiving electrode 170 would connect to an interface configured to detect signals at each of the different frequencies as well as receive up to the maximum amount of voltage provided by all of the group transmitter electrodes. Similar to the CDM embodiment, an OFDM demultiplexer is able to filter out the contributions of the other signals to a particular intersection of a transmitter and receiver electrode (i.e., the results are mathematically independent), thereby permitting the input device to derive positional information.

Returning to the embodiment shown in FIG. 3A, the processing system 110 may indicate to the transmitter control module 305, using the control signals, which transmitter electrodes 160 to drive with the TX_DRV signal as wells as the polarity of the transmitted signal. The transmitter control module 305 may be coupled to each transmitter electrode 160 through a plurality of selectors 315 and logic circuitry (gates 320 and 325). Based on the digital codes shown in the above matrix, the transmitter control module 305 changes the polarity of the transmitter signal using a plurality of polarity signals (TX0_POL-TX3_POL). During the first drive period, TX3_POL is high while the other polarity signals are low. Thus, the output of AND gate 325 for TX3 causes the selector 315 to transmit the inverted output of AND gate 320—i.e., an inverted TX_DRV signal—onto the transmitter electrode 160-4. The transmitter control module 305 performs a similar process during the subsequent drive periods to iteratively change the polarity of the other component signals in Group 1. Moreover, after transmitting the multiplexed signal during the four drive periods, the transmitter control module 305 may deactivate Group 1 (e.g., cause GP1_EN to go low) and activate another group of transmitter electrodes 160. The control module 305 may again use the polarity signals to iteratively vary the polarity of the component signals. Moreover, the logic circuitry in system 300 is for illustrative purposes only; other embodiments, different logic may be used to perform similar functions.

The processing system 110 is coupled to each transmitter electrode 160 through a transmitter drive line (TX_DRV) and the logic circuitry 315 and 320. Alternatively, the processing system 110 may drive a plurality of transmitter signals directly to corresponding groups of transmitter electrodes 160. That is, the processing system 110 may have a separate driver line for each group of transmitter electrodes 160 which would eliminate the logic in system 300 that selects between groups—e.g., AND gates 320 and the GPn_EN signals. Although not shown, in one embodiment, the system 300 may include additional logic that buffers the digital signal from the mux 315 to generate the sensing signal transmitted on the electrodes 160. For example, the low power digital output signal of the mux 315 may be used as control signal for generating a high power sensing signal sufficient to drive the transmitter electrodes 160. An example of such circuitry is discussed in FIGS. 5A, 6, and 7A.

Figure 3B:
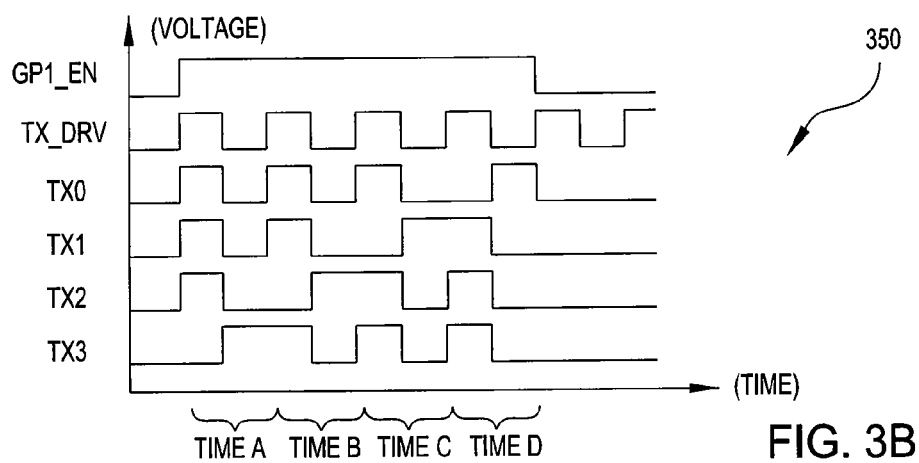
FIG. 3B is a timing diagram of a multiplexed signal, according to an embodiment described herein.

FIG. 3B illustrates a timing diagram 350 corresponding to the system 300. Specifically, the timing diagram 350 illustrates applying the digital codes provided in the four-by-four matrix above. As discussed previously, the group enable signal activates two or more transmitter electrodes in a group—e.g., permits the TX_DRV signal (or a phase shifted version of this signal) to be transmitted in the transmitter electrodes 160 in the selected group. As shown in the system 300, once the GP1_EN goes high (and so long as the polarity signal remains low) the logic of system 300 transmits a signal corresponding to TX_DRV on the transmitter electrodes 160. Based on the digital codes illustrated in the above matrix, during the first drive period (Time A) the TX3_POL signal causes the logic 315, 325 to transmit the inverse (opposite polarity) of TX_DRV on TX3. However, during the second drive period (Time B), TX2_POL causes the system 300 to transmit the inverse of TX_DRV on TX2 while TX3 mirrors TX0 and TX1. This process continues until each transmitter electrode TX0-TX3 has transmitted the inverse of TX_DRV. The receiver 310 receives each of the component signals of the four multiplexed signals transmitted during Time A-D. After the demodulating the signals, the receiver 310 (or other downstream processing logic) decodes the signals using the digital codes. That is, the signals transmitted during the four drive periods are correlated to identify, for example, the capacitance or change of capacitance at a particular intersection of a transmitter electrode 160 and receiver electrode 170. Once the GP1_EN signal goes low, TX0-TX3 no longer transmit the TX_DRV signal. In one embodiment, the system 300 may transmit a DC voltage on transmitter electrodes 160-1-160-4 such as V-com or another reference voltage.

The CDM digital codes used to generate the timing diagram 350 (as shown in the above matrix) are for illustration purposes only. That is, so long as the different digital codes transmitted by the transmitter electrodes are mathematically independent, the receiver 310 is able to filter out the effect of other channels on the channel of interest. Moreover, CDM may be used with any number of assigned grouping of transmitter electrodes 160—e.g., a group with only two transmitter electrodes. However, increasing the membership of a group also increases the length of the digital codes which may require more sophisticated logic and more computational overhead to demodulate the received multiplexed signals. Performing CDM on four transmitter electrodes may be preferred in some embodiments because of the smaller computational overhead relative to larger groupings. An increased SNR may permit the input device to increase the frequency of the clock cycle and perform touch detection in a shorter time than scanning through each transmitter electrode individually.

Figure 4A:
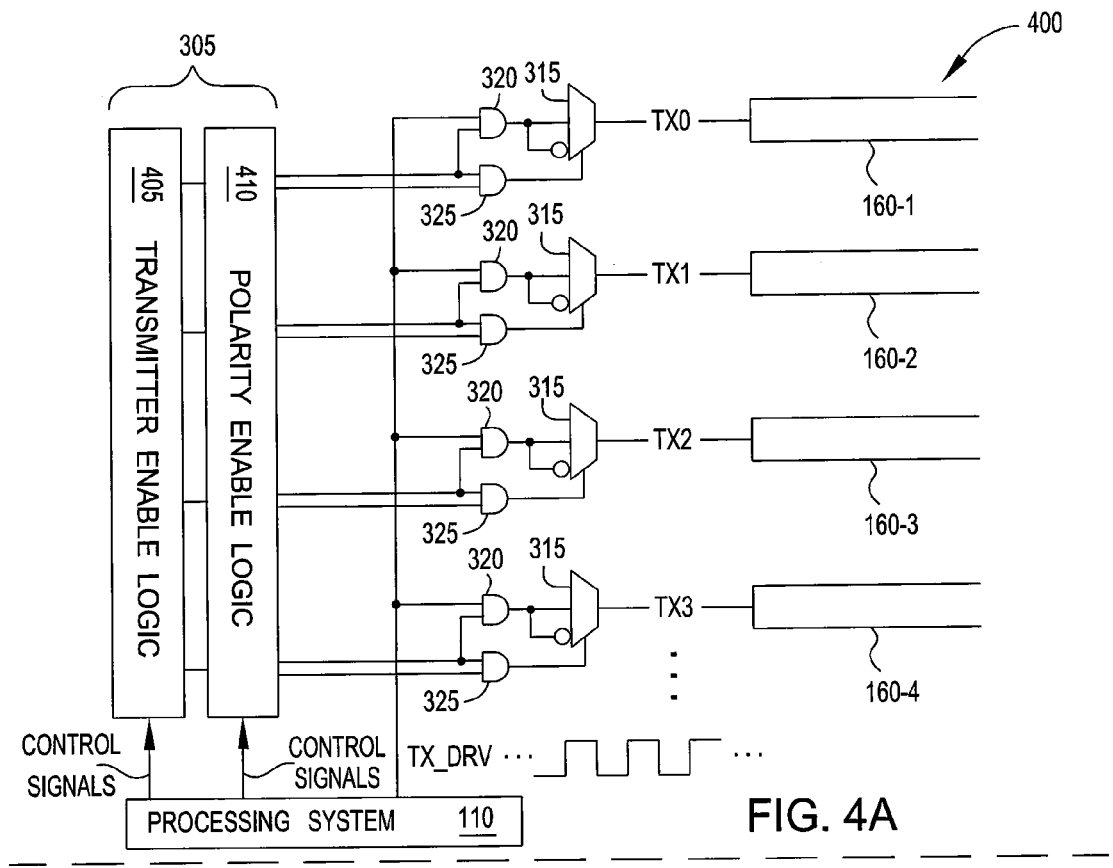
FIGS. 4A-4B are schematic diagrams of a system for transmitting a multiplexed signal suitable for the display device and integrated capacitive sensing circuit shown in FIG. 1, according to embodiments described herein.
Figure 4B:
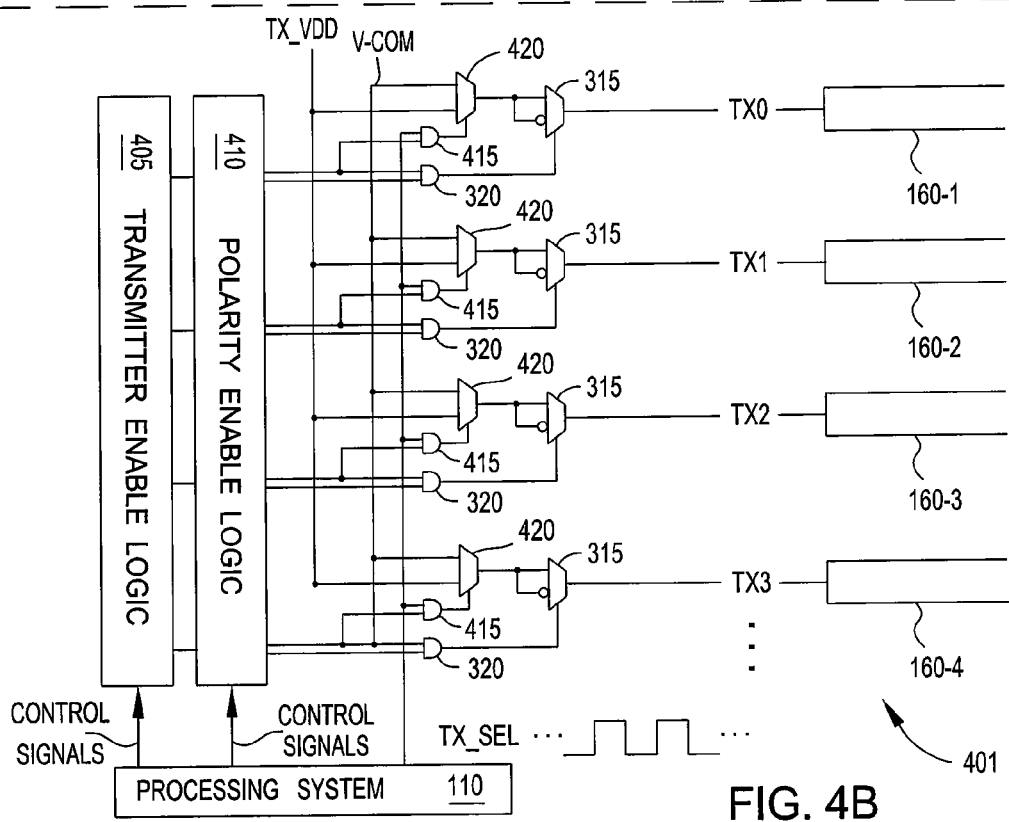

FIGS. 4A-4B are schematic diagrams of a system 400 for transmitting a multiplexed signal suitable for the display device 101 and the integrated capacitive sensing circuit 101 displayed in FIG. 1, according to embodiments described herein. Specifically, system 400 includes a transmitter control module 305, which contains transmitter enable logic 405 and polarity enable logic 410; control logic 315, 320, and 325; transmitter electrodes 160; and processing system 110. The transmitter enable logic 405 may include one or more memory storage elements (flip flops, latches, and the like) used to activate or select a particular group of transmitter electrodes 160. In one embodiment, the memory storage elements are cascaded and share a common clock signal. Alternatively, the transmitter enable logic 405 may include a plurality of traces directly driven by the processing system 110 where each trace corresponds to a particular group of electrodes 160. In this embodiment, the processing system 110 uses the traces to select a particular group of the transmitter electrodes 160 for transmitting a multiplexed signal.

The polarity enable logic 410 may also be implemented by memory storage elements or by a plurality of traces controlled by the processing system 110. For example, the polarity enable logic 410 may include cascaded flip flops with a flip flop for each of the polarity signals transmitted to the AND gates 325. Referring to the timing diagram shown in FIG. 3B, the flip flops may shift the signal every two clock cycles such that each transmitter electrode 160-1-160-4 is inverted for at least one drive period. Alternatively, the polarity enable logic 410 may use digital signals received directly from the processing system 110 (i.e., the digital signals are not stored in intermediate memory elements) where four individual traces are used to control the AND gates 325. During each drive period, one of the traces instructs the system 400 to invert the polarity of the TX_DRV signal. Although specific examples of transmitter enable logic 405 and polarity enable logic 410 are described below, the present disclosure is not limited to these embodiments but may be implemented by any suitable logic that permits multiplexing a signal onto a plurality of transmitter electrodes.

Like in FIG. 3A, the system 400 uses the logic circuitry 315, 320, and 325 to transmit the TX_DRV signal onto the TX0-TX3 electrodes. However, for clarity, the receiver electrodes and the demodulator/demultiplexer circuitry have been removed. In addition, the system 400 may include other circuitry that electrically connects the TX0-TX3 electrodes to a DC voltage when the transmitter enable logic 405 selects a different group of transmitter electrodes 160 for transmitting a multiplexed signal for touch detection. Furthermore, in one embodiment, the input device may use the transmitter electrodes 160 both for updating a display screen of a display device and performing touch detection. When updating the display screen, no touch detection signals are transmitted and all of the transmitter electrodes 160 may be connected to a reference DC voltage (e.g., V-com). Like in FIG. 3A, system 400 may include additional circuitry for converting the output signal from the mux 315 into a suitable sensing signal.

FIG. 4B illustrates a block diagram of the system 401 where a TX_SEL signal is used to generate the multiplex signal transmitted on the transmitter electrodes 160. Instead of using only one control signal (i.e., TX_DRV) as shown in FIG. 4A to control the logic generating the sensing signal, system 401 includes a TX_VDD voltage and a V-com voltage which may already be voltages in the input device used for other purpose such as updating a display screen of the display device 101 (not shown). Thus, FIG. 4B illustrates that the system 401 may use TX_SEL to generate the multiplexed signal using TX_VDD and V-com. In another embodiment, other voltages, such as a TX_LOW or TX_HIGH which are not used during display updating, may be added to the system 401 for generating the multiplexed signal. That is, the system 401 switches between the two voltages using logic circuitry 315, 420, and 415, to generate a level switched signal. As shown, the system 401 includes AND gate 415 and selector 420 which enable the TX_SEL signal to generate the different component signals transmitted on the electrodes 160. So long as the group enable signal from the transmitter enable logic 405 remains high, the outputs of the AND gates 415 mirror the TX_SEL signal. The selector 420 (e.g., a multiplexer) uses the outputs of the AND gates 415 as a select signal. Because the select signals will go from high to low based on the TX_SEL signal, the selector 415 will correspondingly switch between TX_VDD and V-com. In this embodiment, the selector 415 outputs a switched level square wave where the voltage amplitude is defined by the voltage difference between TX_VDD and V-com. Depending on the polarity signal generated by the polarity enable logic 410, the circuitry 320 and 315 may invert this square wave before transmitting the component signal on the transmitter electrodes 160. In this manner, the processing system 110 sends a control signal which the system 401 uses to transmit a multiplexed touch detection signal on the electrodes 160.

In one embodiment, if the transmitter enable logic 405 activates a different group of electrodes 160, the group enable signal for the group shown in FIG. 4B goes low which causes the AND gates 415 to output a low signal, regardless of the TX_SEL signal. In response, the selectors 420 output a DC voltage based on V-com (i.e., the reference voltage) on each transmitter TX0-TX3. Additionally, if the transmitters 160 are used in both updating a display screen and in touch detection, once touch detection is complete (or paused), the processing system 110 may transmit a low voltage using TX_SEL which results in all the transmitter electrodes 160 (i.e., TX0-TXn) being electrically coupled to V-com. Alternatively, the transmitter enable logic 405 may force all the group enable signals for the transmitter electrodes to a low voltage which would have a similar effect as maintaining TX_SEL at a low voltage.

Multiplexing Using Shift Registers or Controlled Traces

Figure 5A:
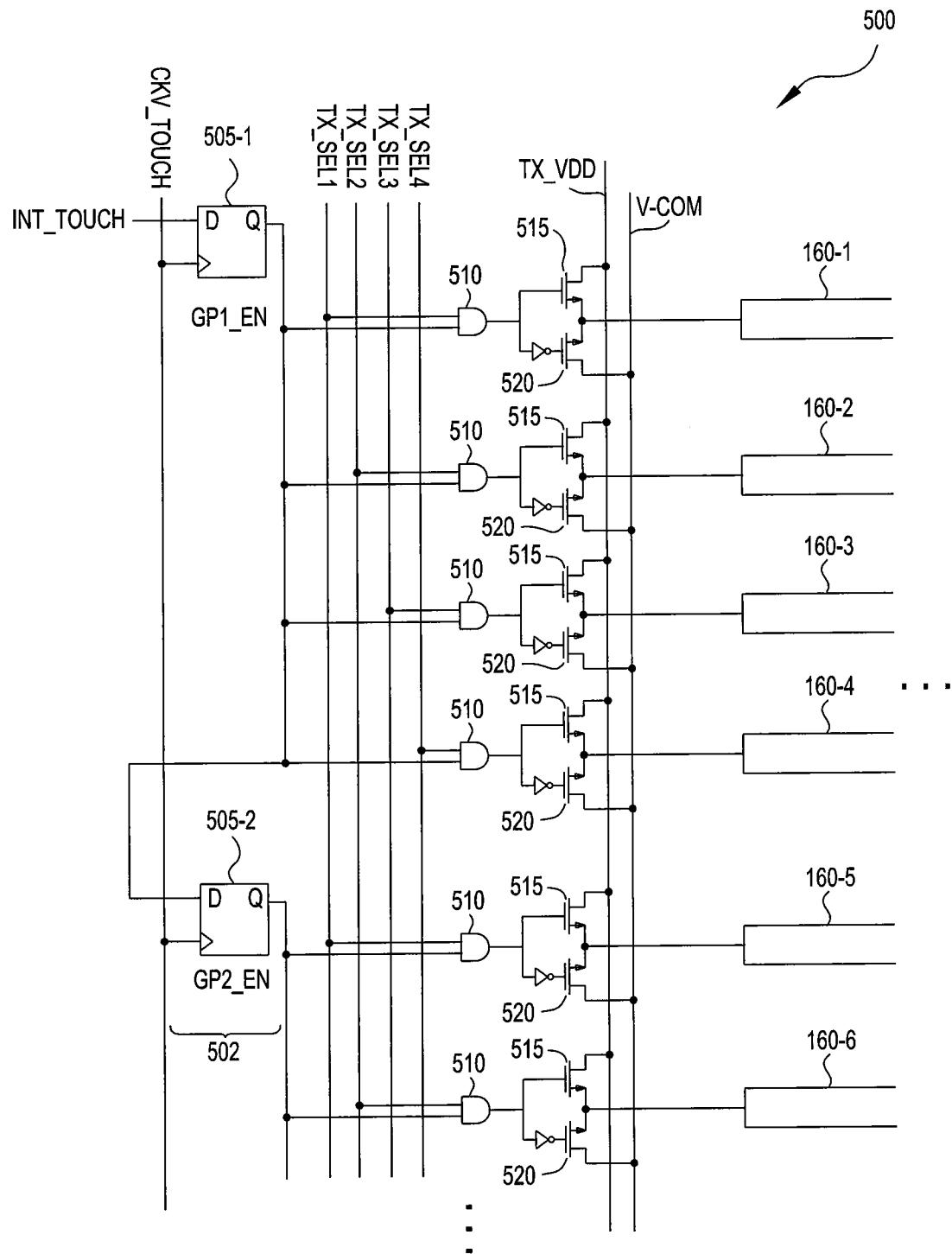
FIG. 5A is a circuit diagram of a portion of an input device for transmitting a multiplexed signal, according to an embodiment described herein.

FIG. 5A is a schematic diagram 500 of a portion of an input device 100 for transmitting a multiplexed signal, according to an embodiment described herein. Specifically, FIG. 5A illustrates a circuit level diagram 500 of one embodiment of the system shown in FIG. 4B. Here, the transmitter enable logic is implemented by a shift register 502 that includes a plurality of cascaded flip flops 505 that share the same clock signal CKV_TOUCH. Advantageously, to save room on a bezel area surrounding the transmitter electrodes 160, only one flip flop 505 is provided for every group of transmitter electrodes 160. The INT_TOUCH signal may be one of the control signals transmitted by the processing system (not shown) which instructs the shift register 502 to activate the first group of transmitter electrodes 160—i.e., electrodes, 160-1-160-4. Although flip flops are shown, other types of memory elements may be used. For example, the glass substrate may have a plurality of latches with a combination of gating logic to provide the group select signal.

In addition to the shift register 502, the circuit 500 uses four TX_SEL signals that each correspond to one of the transmitter electrodes 160 in the group. Note that the number of TX_SEL signals may vary depending on the group size and the specific multiplexing schema used. By dividing the TX_SEL signal into four separate signals (in contrast to the single signal shown in FIG. 4B) the circuit 500 can use these four signals to change the polarity of the signal transmitted on one transmitter electrode 160 relative to the polarity of the signals transmitted on the other electrodes 160 in the group. In this manner, the four TX_SEL signals may be considered as part of the transmitter enable logic and polarity enable logic.

In one embodiment, the four TX_SEL signals may be generated and controlled by the processing system. Alternatively, the circuit 500 may include polarity logic (external to the processing system) that receives one or more TX_SEL signals from the processing system, generates at least one inverted signal, and transmits four TX_SEL signals (including the inverted signal) to the AND gates 510.

The GP1_EN signal and the TX_SEL signals combine to determine what signal is transmitted on the electrodes 160-1-160-4. So long as GP1_EN remains high (i.e., the group is activated) the signal transmitted on the electrodes 160 switches between TX_VDD and V-com (a high power signal) based on the corresponding TX_SEL signal (a low power signal). For example, if TX_SEL1 goes high, the output of the AND gate 510 is high which turns on the n-type transistor 515 but turns off n-type transistor 520, thereby electrically connecting electrode 160-1 to TX_VDD. If TX_SEL1 goes low, the output of the AND gate 510 is low which turns off transistor 515 and turns on transistor 520, connecting electrode 160-1 to V-com.

Figure 5B:
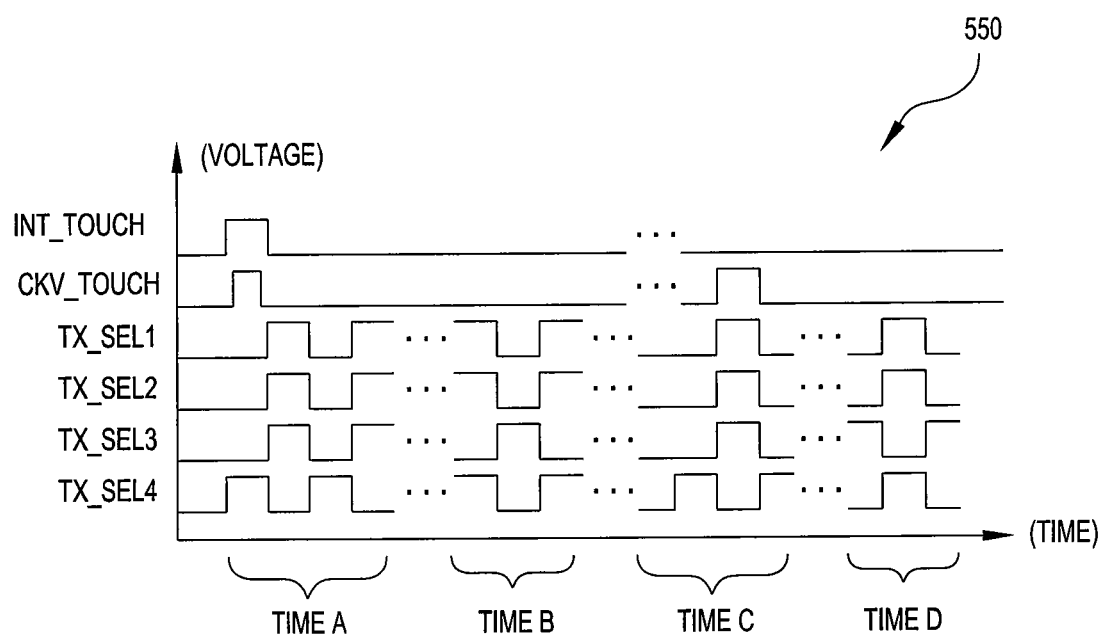
FIG. 5B is a timing diagram of a multiplexed signal, according to an embodiment described herein.

FIG. 5B is a timing diagram of a multiplexed signal based on the four TX_SEL signals illustrated in FIG. 5A. As shown, the INT_TOUCH signal and the TX_SEL signals may be configured to begin transmitting a signal at relatively the same time though this is not a requirement. For example, the TX_SEL traces may have been transmitting signals before the INT_TOUCH instructs the shift register 502 to begin transmitting multiplexed signals.

The CKV_TOUCH signal instructs the flip flops 505 to latch the signal at their respective inputs. Because only the input of flip flop 505-1 is attached to the INT_TOUCH signal, only the group enable signal (GP1_EN) for the first group of transmitter electrodes 160 is activated (assuming the outputs of the flip flops are initialized to output a low voltage). In addition, either the processing system or some other polarity logic phase shifts the TX_SEL4 signal relative to the other TX_SEL signals, thereby reversing its polarity. Accordingly, for the predetermined Time A, the TX_SEL4 signal generates a component signal on transmitter electrode 160-4 that is the opposite polarity of the other component signals transmitted on electrodes 160-1-160-3. At Time B, the TX_SEL4 signal is again phase shifted 180 degrees (or inverted) while the TX_SEL3 signal is also inverted to reverse the polarity of the component signal transmitted on electrode 160-3. The process may continue until each of the electrodes 160 in the group has transmitted an inverse signal for a predetermined number of clock cycles.

At time C, the CKV_TOUCH signal again instructs the cascaded flip flops 505 to latch the signal at their inputs. Because the input of flip flop 505-2 is attached to the output of flip flop 505-1, the GP2_EN signal goes high and activates the second group of transmitter electrodes 160. Moreover, because at Time C the INT_TOUCH signal is low, the GP1_EN signal also goes low, thereby deactivating the first group of transmitter electrodes 160. The process of reversing the polarity of each of the TX_SEL signals repeats for the second group transmitter electrodes 160. Stated differently, the circuit 500 transmits the digital codes shown in the matrix above for each group of transmitter electrodes 160 in the input device. So long as the digital codes result in each channel (i.e., transmitter electrodes) transmitting orthogonal signals, the multiplexed signals can be decoded to generate positional information associated with objects near a touch detection surface of the input device. Moreover, although the drive periods are shown to be a few clock cycles, the present disclosure is not limited to such and may have drive periods including any number of cycles.

Figure 6:
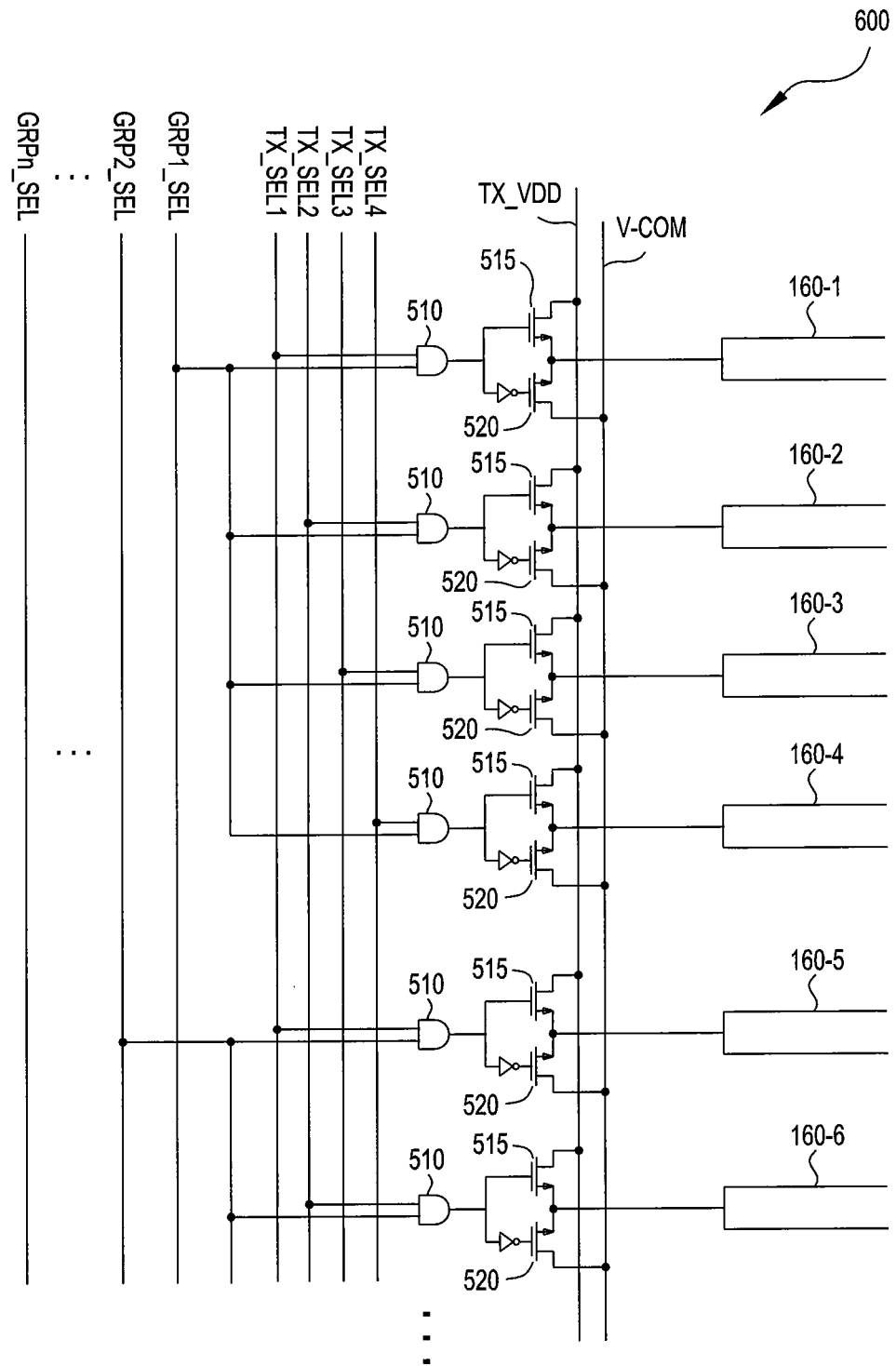
FIG. 6 is a circuit diagram of a portion of an input device for transmitting a multiplexed signal, according to an embodiment described herein.

FIG. 6 is a schematic diagram 600 of a portion of an input device 100 for transmitting a multiplexed signal, according to an embodiment described herein. Instead of a using a shift register as shown in FIG. 5A, the control circuit 600 may include a plurality of controlled traces (GRP1_SEL-GRPn_SEL) for transmitting the group enable signals. As shown, the group enable signals are driven onto the substrate that includes the transmitter electrodes 160. Doing so permits the control circuit 600 to omit any memory storage elements for activating different groups of electrodes 160. Although not shown, any transmitter enable logic needed to determine which group signal to enable may be located in a circuit external to the substrate on which control circuit 600 is disposed. In one embodiment, the group enable signals may be provided directly from the processing system (not shown).

In one embodiment, the GP_EN signal are mutually exclusive such that only one group is activated at a time. Thus, the GP_EN trances perform a similar function as the shift register 502 shown in FIG. 5B. Nonetheless, the rest of the circuit elements and signals shown in FIG. 6 may have a similar function as the corresponding elements shown in FIG. 5A. In another embodiment, other voltages, such as a TX_LOW or TX_HIGH which are not used during display updating, may be added to the system 600 for generating the multiplexed signal transmitted on the transmitter electrodes 160.

Figure 7A:
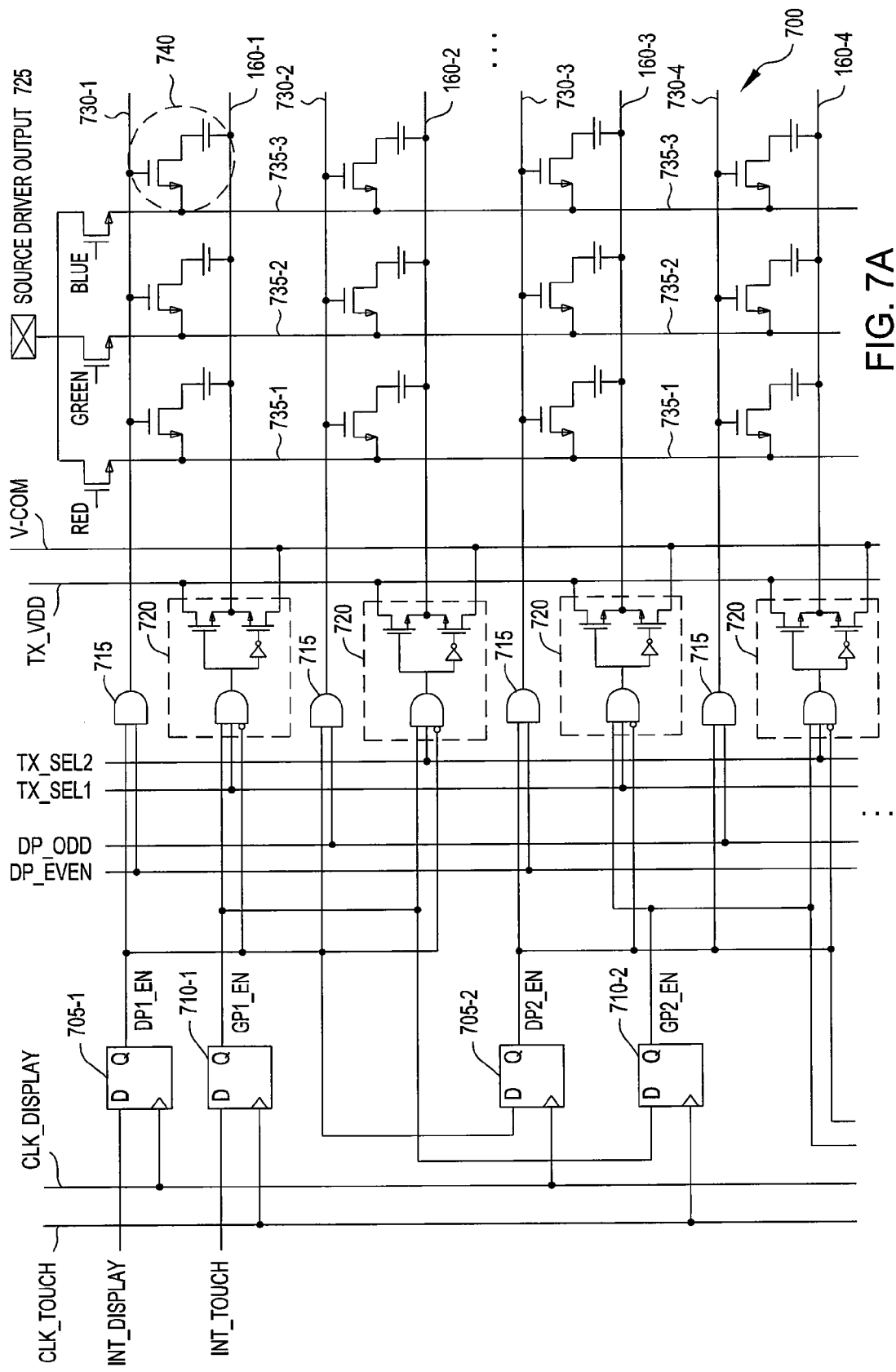
FIG. 7A is a circuit diagram for transmitting a multiplexed signal suitable for use with the display device and integrated capacitive sensing device shown in FIG. 1, according to an embodiment described herein, according to an embodiment described herein.

FIG. 7A is a schematic diagram 700 for transmitting a multiplexed signal suitable for use with the display device 101 and integrated capacitive sensing device 100 shown in FIG. 1, according to an embodiment described herein. Specifically, the control circuit 700 illustrates integrating the input device 100 and display device 100 where the transmitter electrodes 160 are used both when updating the display screen and when performing touch detection.

Figure 7B:
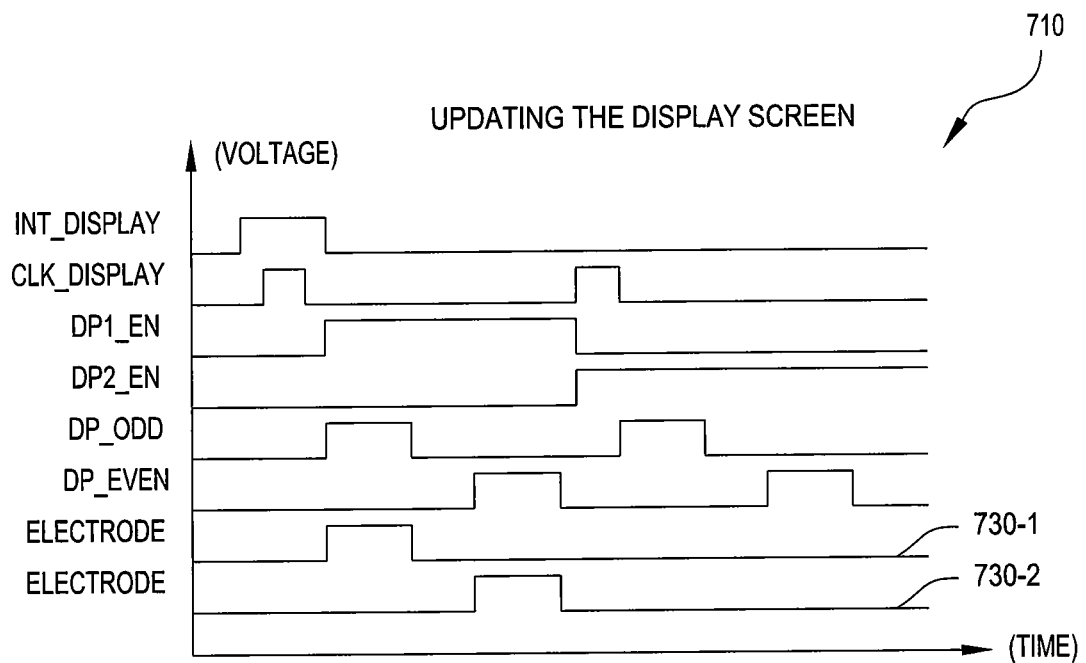
FIG. 7B-7C are timing diagrams associated with the circuit shown in FIG. 7A, according to embodiments described herein.

The system 700 includes flip flops 705 that form a shift register for updating a display screen. The INT_DISPLAY and CLK_DISPLAY signals are used to activate a first group of display electrodes 730 in the input device—i.e., display electrodes 730-1 and 730-2. Arranging the display electrodes in groups may reduce the area of the bezel used by the circuitry tasked with updating display screen. As shown here, each display electrodes 730 corresponds to one transmitter electrode 160. However, in one embodiment, a plurality of different display electrodes 730 may correspond to one of the transmitter electrodes. That is, the common electrodes may be arranged into one or more transmitter electrodes. In contrast, the display electrodes 730 may be individually addressable by the cascaded flip flops 705 and the display signals DP_ODD and DP_EVEN so that each pixel 740 may be set by the gamma reference signals 735 provided by the source driver output 725. In such an embodiment, the circuit 700 may need to include a plurality of instances of the display logic 715 for every one instance of the touch detection logic 720 rather than the one-to-one relationship shown in FIG. 7.

Once the first flip flop 705-1 is activated, the DP1_EN signal goes high which causes the touch detection logic 720 to couple the transmitter electrodes 160-1 and 160-2 to V-com. As shown in the timing diagram 770 of FIG. 7B, so long as the DP1_EN signal remains high, the DP_ODD and DP_EVEN signals control the signals transmitted on the electrodes 730-1 and 730-2. For example, once electrode 730-1 goes high, this turns on the n-type transistors associated with the pixels 740 coupled to the electrode. This permits the source driver output 725 to set the voltage on each of the capacitors in the pixels 740. That is, the DP_ODD and DP_EVEN signals remain high long enough to permit the source driver to set a different voltage value for the red, green, and blue pixels using the RED, GREEN, and BLUE control signals on each of the display electrodes 730-1-730-2. Once the CLK_DISPLAY signal again switches to a high, the output of flip flop 705-1 is latched into flip flop 705-2 and the DP_ODD and DP_EVEN can activate the display electrodes 730-3 and 730-4 to update the pixels 740 coupled to those electrodes.

Along with updating the pixels in the display, the circuit 700 may perform touch detection. Touch detection may be performed between updating different rows in the display, between updating different groups of the rows, or before or after the rows in the display are updated. Moreover, touch detection may be divided or interspersed with updating the display. For example, after one or more rows of the display screen are updated, the input device may perform touch detection for one or more of the electrodes group before continuing to update more rows of the display screen. Nonetheless, in one embodiment, because the transmitter electrodes 160 may be shared, the pixels are not updated when touch detection is performed. That is, updating the display may be paused while touch detection is performed or the input device may wait for one function to finish before the other begins.

During touch detection, the DP_EN signals may all be held at a low voltage to permit the touch detection logic 720 to activate. For example, when INT_TOUCH goes high, the circuit 700 may contain logic (not shown) that resets the flip flops 705 to output a low voltage. As shown here, touch detection uses cascaded flip flops 710 (i.e., a shift register) to select different groups of transmitter electrodes. Although the groups shown in FIG. 7A include only two transmitter electrodes 160, the present disclosure is not limited to such and may contain any number of electrodes 160. Furthermore, in one embodiment, other voltages, such as a TX_LOW or TX_HIGH which are not used during display updating, may be added to the system 600 instead of TX_VDD and V-COM for generating the multiplexed signal transmitted on the transmitter electrodes 160.

Figure 7C:
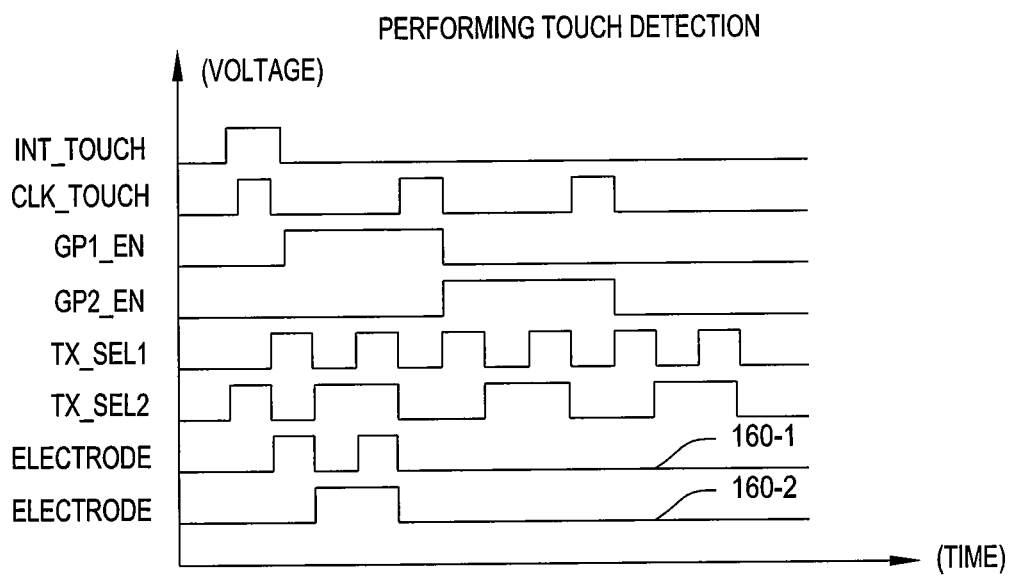

FIG. 7C illustrates a timing diagram 780 for performing touch detection which transmits the multiplexed signal based on the matrix:

$$\begin{bmatrix} 1 & 1 \\ -1 & 1 \end{bmatrix}$$

In this matrix, the rows correspond to the polarity of the signals transmitted on the transmitter electrodes 160 while the columns define a drive period. In order to transmit the inverse signal on transmitter electrode 160-2 during the first drive period, the TX_SEL2 signal is phase shifted during the first drive period relative to the TX_SEL1 signal. During the second drive period, however, the TX_SEL1 and TX_SEL2 signals have the same polarity. Controlling the TX_SEL signals based on the orthogonal codes shown in the above matrix results in electrode 160-2 transmitting the reverse polarity signal during the first drive period and transmitting a signal with the same polarity as transmitter electrode 160-1 during the second drive period. The CLK_TOUCH signal goes high after the digital codes defined in the above matrix are transmitted across the electrodes 160-1 and 160-2, signaling to the circuit 700 to activate the next group of transmitter electrodes 160.

Multiplexing Using a Decoder Module

Figure 8:
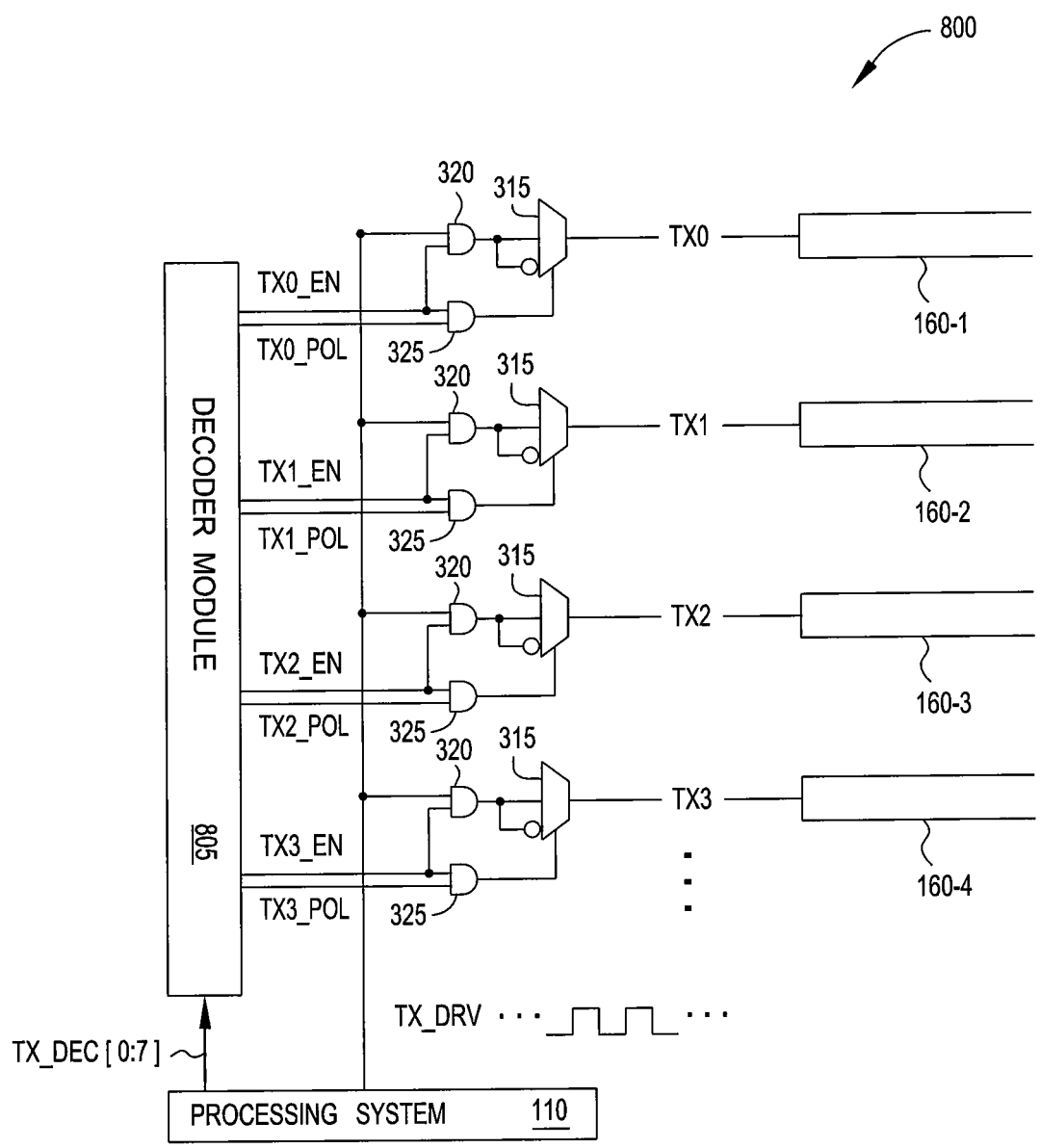
FIG. 8 is a schematic diagram for transmitting a multiplexed signal suitable for use with the display device and integrated capacitive sensing device shown in FIG. 1, according to an embodiment described herein.

FIG. 8 is a schematic diagram 800 for transmitting a multiplexed signal suitable for use with the display device and integrated capacitive sensing device shown in FIG. 1, according to an embodiment described herein. Instead of using memory elements or control traces for activating groups or controlling the polarity of a multiplexed signal, the system 800 uses a decoder module 805 for generating a multiplexed signal using the channels established by the transmitter electrodes 160. In one embodiment, the decoder module 805 provides direct access and latency reduced timing for group enable signals (GP1_EN) and the polarity signals (TX0-4_POL). Although system 800 illustrates generating the multiplex signal based on the TX_DRV signal received from the processing system 100, any of the methods described above to drive the transmitter electrodes may be used—e.g., switching between a first and second voltage. Moreover, the system 800 may further include logic for connecting the transmitter electrodes 160 to a reference voltage (e.g., V-com) when a group is not currently activated for touch detection or when the electrodes 160 are being used to update a display screen of the device.

The decoder module 805 receives a digital signal from the processing system 110 (TX_DEC) which, when decoded, provides the instructions for generating the group and polarity signals. The following table illustrates one example of coding the TX_DEC signal to generate the multiplexed signal.

TABLE 1

| BIT PORTION OF TX_DEC | CODE | CORRESPONDING SIGNAL |
|---|---|---|
| TX_DEC[2:0] | 000 | TX0_EN |
| | 001 | TX1_EN |
| | 010 | TX2_EN |
| | 011 | TX3_EN |
| | 100 | TX3,1_EN |
| | 101 | TX3,0_EN |
| | 110 | TX3,2,1,0_EN |
| | 111 | |
| TX_DEC[4:3] | 00 | TX0_POL |
| | 01 | TX1_POL |
| | 10 | TX2_POL |
| | 11 | TX3_POL |
| TX_DEC[5:7] | 000 | Group 1 |
| | 001 | Group 2 |
| | 010 | Group 3 |
| | 011 | Group 4 |
| | 100 | Group 5 |
| | 101 | Group 6 |
| | 110 | Group 7 |
| | 111 | Group 8 |

For example, if the processing system 110 transmitted the digital signal [000 01 111] (where the first digit is the most significant), the decoder module 805 would transmit level shifted signals (e.g., square waves) on the TX3,2,1,0_EN signals and to transmit a high voltage on TX1_POL in order to generate the desired multiplexing signal. As a result, the TX0-3 electrodes transmit four level shifted signals except that the signal transmitted by TX1 would have a reverse polarity relative to the other signals. Subsequently, the processing system 110 may transmit a new digital signal to change, for example, which transmitter electrode 160 transmits the inverted signal—i.e., a digital signal with different bits in the TX_DEC[4:3] portion. Note that decode logic shown in Table 1 will change based on the configuration of the system—e.g., the number of groups, the size of the groups, the digital codes used, as well as the multiplexing schema used.

CONCLUSION

Various embodiments of the present technology provide input devices and methods for improving usability. Specifically, the input device simultaneously transmits a multiplexed signal across two or more transmitter electrodes used in touch detection. The multiplexed signal includes two or more component signals that are transmitted on respective electrodes (or channels). The component signals are then decoded and correlated to indicate a positional location of an input object in a touch detection area of the input device. Various multiplexing schemas—e.g., code division multiplexing, frequency division multiplexing, orthogonal frequency division multiplexing, and the like—may be used to generate the multiplex signal and demultiplex the received results. For example, the input device may use orthogonal digital codes to generate a component signal for each of the transmitter electrodes where, for a certain number of clock cycles, each one of the component signals is inverted respective to the others. The input device's receiver then decodes the component signals to determine a location of an object in the touch detection area of the input device.

Thus, the embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

We claim:

1. A processing system coupled to transmitter electrodes and receiver electrodes, the processing system comprising:
   a driver module coupled to the transmitter electrodes, each of the transmitter electrodes comprising one or more common electrodes configured for display updating and touch detection,
   wherein the driver module is configured to simultaneously drive a first one of the transmitter electrodes with a first signal and second one of the transmitter electrodes with a second signal, wherein the first signal and the second signal are based on different codes of a plurality of distinct digital codes, wherein each of the distinct digital codes is substantially mathematically independent from each other, and wherein the driver module is configured to drive the first and second signals when display updating is inactive;
   a polarity shifter configured to selectively invert the first signal relative to the second signal during a first time period;

a receiver module coupled to the receiver electrodes, the receiver module configured to receive, using the receiver electrodes, resulting signals based on the first and second signals; and a determination module configured to generate demodulated output signals by demodulating the resulting signals based on the distinct digital codes and to determine positional information for an input object at least partially based on the demodulated output signals.

2. The processing system of claim 1, wherein the distinct digital codes are part of a code division multiplexing schema.

3. The processing system of claim 1, wherein the first and second signals are the same frequency, wherein the first signal is phase shifted relative to the second signal.

4. The processing system of claim 1, wherein the polarity shifter is configured to selectively invert the second signal relative to the first signal during a second time period subsequent to the first time period.

5. The processing system of claim 1, wherein driving the first and second signals simultaneously increases the signal to noise ratio relative to transmitting only one of the first and second signals individually.

6. The processing system of claim 1, wherein the driver module drives the first signal and the second signal by generating a plurality of control signals used to activate logic circuitry.

7. The processing system of claim 1, wherein the driver module is configured to generate the first and second signals by switching between a first and a second voltage potential.

8. The processing system of claim 7, wherein the first voltage potential is a common voltage of a display device used when updating the display screen.

9. A display device having an integrated capacitive sensing device, the display device comprising:
   receiver electrodes;
   transmitter electrodes, each of the transmitter electrodes comprising one or more common electrodes configured for display updating and touch detection;
   logic circuitry disposed on a substrate comprising the transmitter electrodes;
   a processor coupled to the transmitter electrodes via the logic circuitry, wherein, during a first period, the processor is configured to transmit control signals to the logic circuitry to simultaneously drive a first one of the transmitter electrodes with a first signal and second one of the transmitter electrodes with a second signal, wherein the first signal and the second signal are based on different codes of a plurality of distinct digital codes, wherein each of the distinct digital codes is substantially mathematically independent from each other, and wherein the processor is configured to drive the first and second signals when display updating is inactive,
   wherein the logic circuitry comprises switching logic that generates the first and second signals by switching between a first and a second voltage potentials based on at least one of the control signals, and wherein the processor drives a polarity signal, wherein the switching logic is configured to invert the first signal relative to the second signal during a first time period based on the polarity signal;
   wherein the processor is coupled to the receiver electrodes and configured to receive, using the receiver electrodes, resulting signals based on the first and second signals during the first period,
   wherein the processor is configured to generate demodulated output signals by demodulating the resulting signals based on the distinct digital codes and to determine positional information for an input object at least partially based on the demodulated output signals.

10. The display device of claim 9, wherein the logic circuitry comprises a first plurality of cascaded memory elements, wherein each of the first plurality of memory elements selects a group of at least two transmitter electrodes for performing touch detection.

11. The display device of claim 10, wherein the logic circuitry comprises a second plurality of cascaded memory elements, wherein each of the second plurality of memory elements selects a group of at least two of the common electrodes when updating a display screen in the display device.

12. The display device of claim 10, wherein the first plurality of cascaded memory elements is a shift register.

13. The display device of claim 9, wherein the switching logic is configured to invert the second signal relative to the first signal during a second time period subsequent to the first time period based on the polarity signal.

14. The display device of claim 9, wherein the processor is mounted on the substrate and the receiver electrodes are disposed on the substrate.

15. A method for performing touch detection, the method comprising:
   transmitting simultaneously a first transmitter signal on a first transmitter electrode and a second transmitter signal on a second transmitter electrode, wherein each of the transmitter electrodes comprises one or more common electrodes configured for both updating displayed information in a display screen and performing touch detection,
   wherein the first and second transmitter signals are respective channels of a multiplexed signal generated according to a multiplexing schema, and wherein the first and second transmitter signals are transmitted when display updating is inactive, and wherein a polarity signal inverts the first signal relative to the second signal during a first time period;
   receiving a first resulting signal on a first receiver electrode based on the first transmitter signal and a second resulting signal on a second receiver electrode based on the second transmitter signal;
   demultiplexing the first and second resulting signals; and
   determining positional information for an input object at least partially based on the demultiplexed signals.

16. The method of claim 15, wherein the multiplexing schema is one of:
   code division multiplexing and frequency division multiplexing.

17. The method of claim 15, wherein the first and second transmitter signals are orthogonal.

18. The method of claim 15, wherein the polarity signal inverts the second signal relative to the first signal during a second time period subsequent to the first time period.

* * * * *